Aug. 11, 1959   A. SHER ET AL   2,899,160
ELECTRIC CABLE CLAMP
Filed Feb. 7, 1957   4 Sheets-Sheet 1

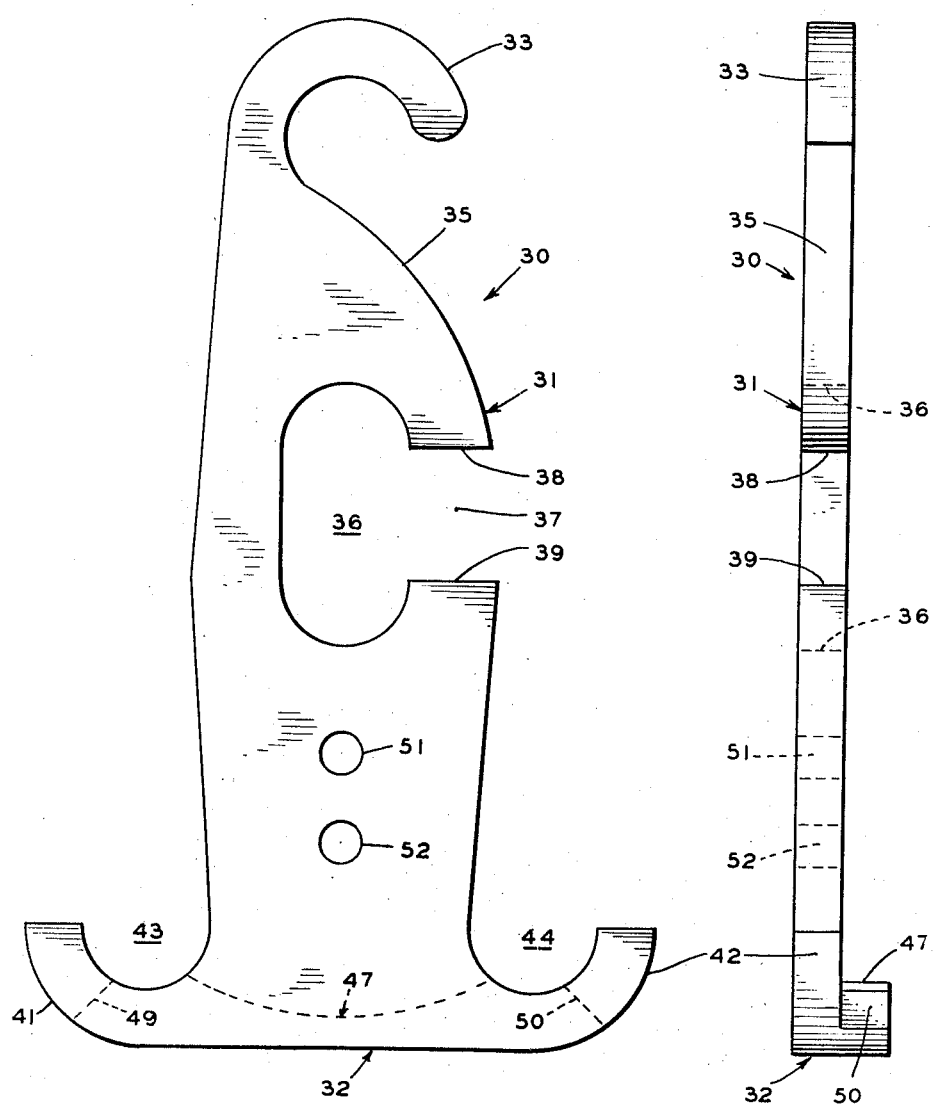

Aug. 11, 1959     A. SHER ET AL     2,899,160
ELECTRIC CABLE CLAMP

Filed Feb. 7, 1957     4 Sheets-Sheet 4

United States Patent Office 2,899,160
Patented Aug. 11, 1959

2,899,160

ELECTRIC CABLE CLAMP

Arnold Sher, New York, N.Y., and Joseph S. Amstock, Trenton, N.J., assignors to John A. Roebling's Sons Corporation, Trenton, N.J., a corporation of Delaware Application February 7, 1957, Serial No. 638,811

4 Claims. (Cl. 248—61)

The present invention relates to electric cable clamps and more particularly to such clamps for use in metallic messenger supported aerial cable installations.

The principal object of the present invention has been the provision of a novel and improved electric cable clamp for carrying electric cables suspended from a metallic messenger.

Another object of the invention has been the provision of such a cable clamp which is constructed so as to permit removal of one or more electric cables therefrom without complete disassembly of the clamp, whereby cables other than the one or ones to be removed need not be disturbed.

Another object of the invention has been the provision of an electric cable clamp of the above type which is especially adapted for use in power distribution systems and which is inexpensive and reliable.

A further object of the invention has been the provision of a clamp of the above type especially suited for the distribution of three phase alternating current power and which is constructed so as to minimize voltage drop in the distribution circuit.

Still another object of the invention has been the provision of means, in combination with a clamp of the above type, for making the clamp easily usable with cables of different sizes but without impairing the ease with which one or more cables may be removed from the clamp.

A feature of the invention has been the provision of an electric cable clamp of the above type in which the electric cables are positioned in the form of a small equilateral triangle with the metallic messenger positioned directly above the apex of the triangle.

Other and further objects, features and advantages of the invention will appear more fully from the following description.

The invention will now be described in connection with the appended drawings illustrating one form of construction in accordance with the invention and in which:

Fig. 3 is a front elevational view of the second clamping element of a cable clamp according to the invention;

Fig. 4 is a side elevational view of the clamping element of Fig. 3;

Figure 1:
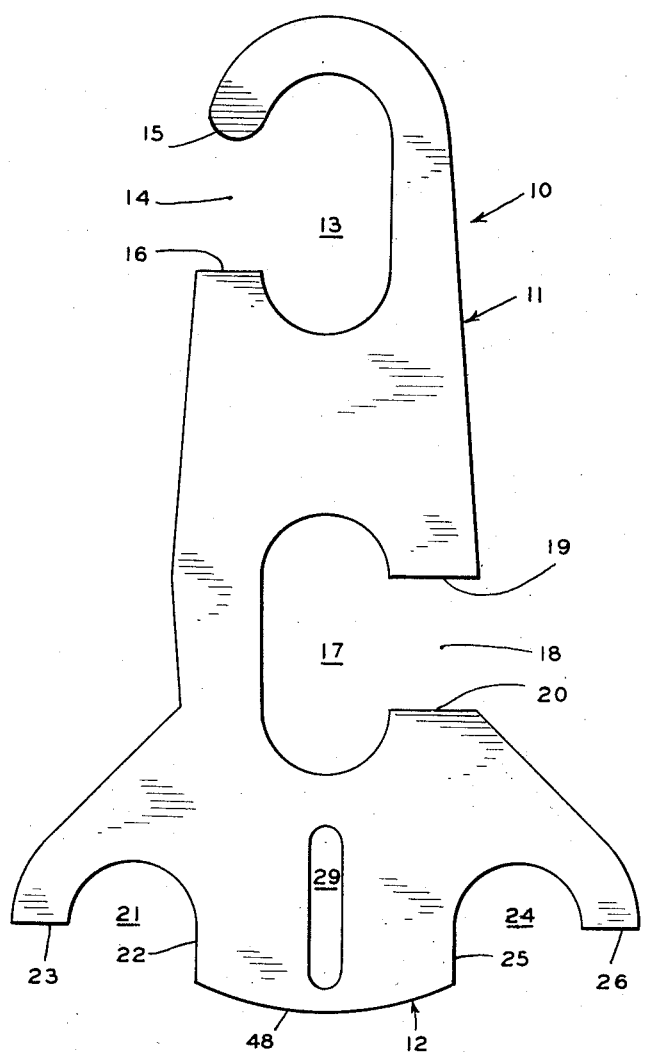
Fig. 1 is a front elevational view of one clamping element of a cable clamp according to the invention.
Figure 2:
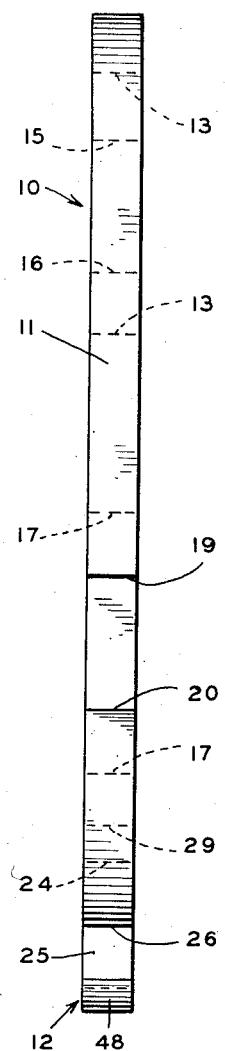
Fig. 2 is a side elevational view of the clamping element of Fig. 1.

Referring now to the drawings, and more particularly to Figs. 1 and 2, the clamping element 10 illustrated therein comprises a relatively narrow upper portion 11 and a relatively wide lower portion 12, resembling somewhat an inverted T. The element 10, which is preferably flat, is thin in comparison with its length. A vertically elongated slot 13 is provided adjacent the upper end of the portion 11. The slot 13 is centrally located and has an opening 14 in one side thereof. The upper end of the opening 14 is bounded by a rounded shoulder 15, while the lower end is bounded by a flat horizontal shoulder 16. The upper end of the portion 11 is shaped like a hook terminating at the surface 15, the hook opening facing to the left in Fig. 1.

Another centrally located vertically elongated slot 17 is provided adjacent the lower end of the portion 11, the slot 17 having an opening 18 on the side thereof opposite the opening 14 of the slot 13. The opening 18 is bounded at the top and bottom by flat horizontal shoulders 19 and 20, respectively.

The left side (Fig. 1) of the lower portion 12 is provided, at the bottom, with a semicircular groove 21, the opening of the groove facing downward and the inside edge of the groove being extended by a vertical surface 22. The other side of the groove ends at a horizontal surface 23 which is preferably located at the same height as the center of the semicircle. A similar groove 24 ending in surfaces 25 and 26 is provided at the right side of the lower portion 12. The centers of curvature of the grooves 21 and 24 and of the upper end of the slot 17 are preferably disposed so as to form generally an equilateral triangle. The longitudinal center line of the slot 13 is preferably directly above the longitudinal center line of the slot 17, as is also the longitudinal center line of a narrow vertically elongated slot 29 formed in the lower portion 12 generally at the level of the grooves 21 and 24.

Figure 5:
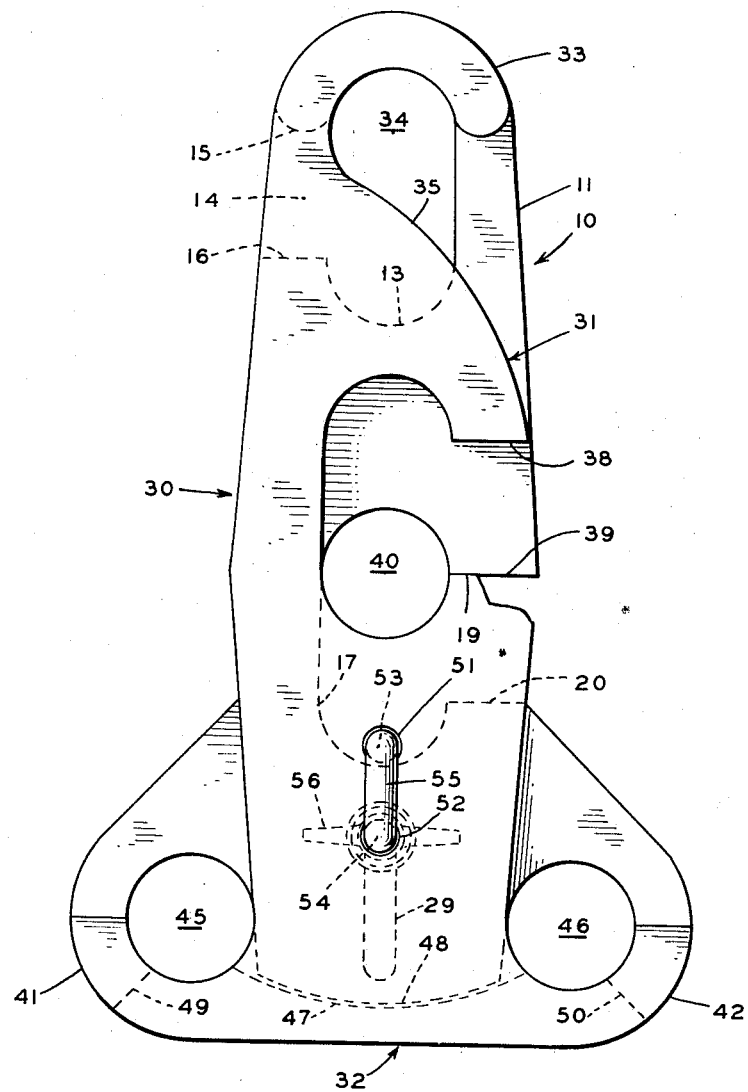
Fig. 5 is a front elevational view illustrating the clamping elements of Figs. 1 and 3 in assembled relation, with the clamp elements in cable clamping position.

The clamping element 30 of Figs. 3 and 4 is preferably flat and is also shaped somewhat like an inverted T with a long narrow upper portion 31 and a wide lower portion 32. The upper end of the portion 31 terminates in a hook-like extension 33, with the hook opening extending downwardly and to the right (Fig. 3) so that when the element 30 overlies the element 10, as shown in Fig. 5, the upper ends of the portions 11 and 31 will enclose a hole 34 having a semi-circular top bonded by the overlying portions of the hook 33 and the top of the slot 13. The bottom of the hole 34 will have a shape determined by the sloping surface 35 on one side and by the right hand wall of the slot 13 on the other side.

Adjacent the middle of the portion 31 there is provided a centrally located vertically elongated slot 36 having an opening 37 in the right side thereof, the opening 37 being bounded at the top and bottom by horizontal surfaces 38 and 39, respectively. The slots 36 and 17 may be identical in shape and size but, as will be seen from Fig. 5, when the elements 11 and 30 directly overlie each other, the slot 36 is at a higher level than the slot 17. In this way the semicircular bottom of the slot 36 and the semicircular top of the slot 17 define a circular hole 40 which extends clear through both elements 10 and 30, as does the hole 34.

The bottom portion 32 is provided with hook-like extensions 41 and 42 at respective sides thereof forming semicircular grooves 43 and 44. These grooves 43 and 44 are arranged so that when the elements 10 and 30 overlie each other directly, as in Fig. 5, the walls of the grooves 21 and 43 and the walls of the grooves 24 and 44 define circular holes 45 and 46, respectively, extending clear through elements 10 and 30. The ends of the hooks 41 and 42 preferably extend slightly beyond the points needed for the grooves 43 and 44 to be true semicircles, so that some overlapping with the corresponding parts of the element 10 occurs, as shown in Fig. 5.

The bottom of the portion 32 is provided with a projecting flange 47 having a central portion conforming in shape to the bottom surface 48 of the portion 12. The sides of the flange 47 terminate at the surfaces 49 and 50. The flange 47 should be cut out to conform to the bottom surfaces of the holes 45 and 46. Provision of the flange 47 permits easy accurate positioning of the elements 10 and 30 in their Fig. 5 position.

Figure 7:
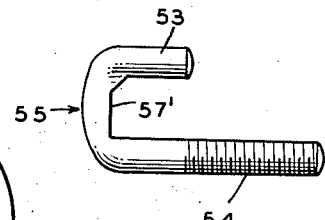
Fig. 7 is a side view illustrating a U bolt for holding the clamping elements together.

Adjacent the lower end of the portion 31 there is provided a pair of centrally located, vertically spaced holes 51 and 52 adapted to accommodate shanks 53 and 54 respectively, of a U bolt 55 (Fig. 7). The shank 54 is longer than the shank 53 and is threaded to accommodate a nut, preferably a wing nut as shown at 56 (Fig. 5). The holes 51 and 52 are located so that when the shanks 53 and 54 are inserted therein, the end of the shank 53 will be in contact with or just above the bottom of the slot 17 when the elements 10 and 30 directly overlie each other. At the same time the shank 54 will either contact or be just below the top of the slot 29. The shank 53 preferably does not extend completely across the thickness of the element 10, while the shank 54 should extend further than this thickness in order to permit the wing nut 56 to be threaded thereon. It will be observed that when the wing nut 56 is tightened, the elements 10 and 30 will be clamped firmly together in their Fig. 5 relationship. The inner surface 57 of the U bolt 55 is preferably flat to conform to the outer surface of the element 30.

The holes 40, 45 and 46, which are preferably disposed in the shape of an equilateral triangle, are each adapted to accommodate an electrical cable such as is used for power distribution. The hole 34 is adapted to accommodate a messenger cable from which it is desired to suspend the electrical cables. The spacing between the holes 40, 45 and 46 and between the holes 40 and 34 may be selected as desired consistent with the spacing between adjacent clamps along the messenger cable. The permanent relative positions imparted to electrical cables by use of the clamp of the invention allows the use of reduced cable insulation and prevents intercontact between the wires. Since use of the clamp permits close cable spacing, tree trimming in wooded areas is minimized.

The elements 10 and 11 should be made from a rigid electrically insulating material which is strong enough to withstand the load to be expected, including cable weight, wind pressure, ice, snow, etc. In general a plastic material is preferred. One example of a suitable plastic is the acrylic resin sold by the Rohm & Haas Company of Philadelphia, Pennsylvania, under the trademark "Plexiglas." The U bolt and wing nut 56 are preferably made from a corrosion resistant metal, but may be made from plastic or other suitable material.

Figure 8:
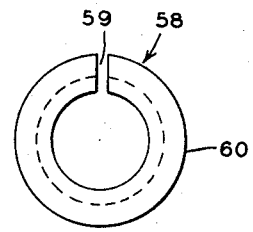
Fig. 8 is a front view of a bushing for use with cables or messengers having diameters smaller than the clamping element holes.
Figure 9:
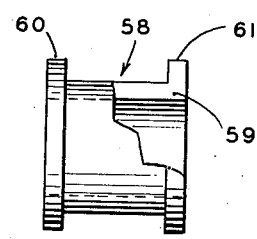
Fig. 9 is a side elevational view of the bushing of Fig. 8.

When the electrical cables and/or messenger are smaller in diameter than the corresponding holes 34, 40, 45 and 46, a bushing may be used to match the cable or messenger diameter with the inside diameter of the holes. A preferred form of bushing, in accordance with the invention, is illustrated at 58 in Figs. 8 and 9. This bushing 58, which is preferably made from molded rubber or other flexible insulating material, has an inside diameter equal to the cable diameter and an outside diameter equal to the inside diameter of the corresponding hole. The bushing 58 is provided with a radial slot or split 59 extending throughout the length thereof to permit the bushing to be placed on the cable. The bushing 58 is provided with radially extending flanges or lips 60 and 61 at the ends thereof, these lips having a diameter greater than the inside diameter of the corresponding clamp holes, so as to keep the bushings positioned in the clamp holes and to prevent longitudinal movement of the cables. The bushing length, between lips, should be equal to the combined thickness of the elements 10 and 30 in the region of the holes.

With the clamp elements 10 and 30 in the positions thereof illustrated in Fig. 5, the messenger cable and the electric cables (either with or without the bushings 58) will be held firmly in their relative positions. When it is desired to remove one or more electric cables from the clamp without disturbing the other cable or cables, the wing nut 56 may be backed off sufficiently for the U bolt 55 to be pushed into a position in which the end of the shank 53 is clear of the element 10, i.e., the end of the shank will be located inside the hole 51. The element 10 may then be slid vertically until the shank 54 of the U bolt 55 contacts the bottom of slot 29, which is the position shown in Fig. 6.

Figure 6:
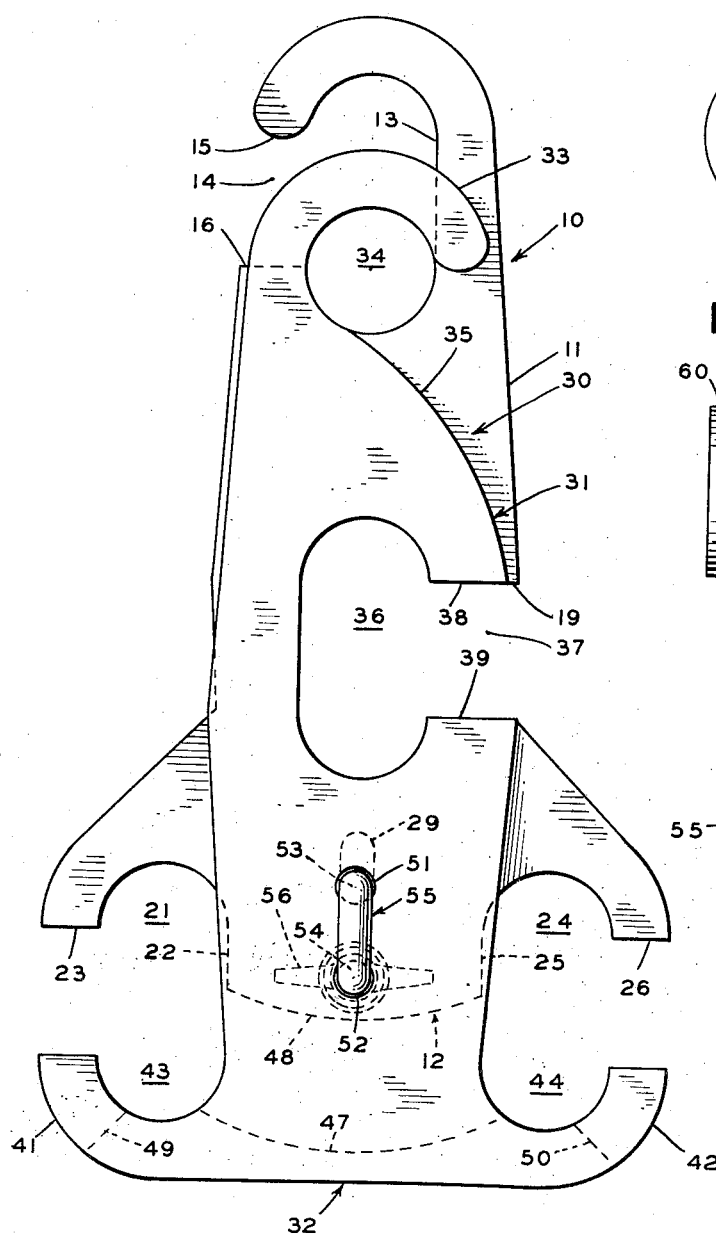
Fig. 6 is a view similar to Fig. 5 but with the clamping elements in cable releasing positions.

In Fig. 6 it will be seen that the clamping elements are vertically offset so that the openings 18 and 37 of the slots 17 and 36, respectively are substantially in registration so that an electric cable (with bushing, if provided) can be removed or inserted. By "vertical" is meant up or down motion of the elements relative to each other and not necessarily up or down relative to the ground. The size of the openings 18 and 37 should be selected so that such removal or insertion can be effected easily. Also in Fig. 6, the grooves 21 and 43 and the grooves 24 and 44 are shown separated a sufficient amount to permit removal or insertion of electric cables (with bushings, if provided). In each case, one or more electric cables which are not to be removed will be supported by the bottom of the slot 36, the bottom of the groove 43 or the bottom of the groove 44, as the case may be.

Complete disassembly of the clamp is prevented by the shank 54, which must be completely removed for such complete disassembly. While the element 10 is in the Fig. 6 position thereof, the element 30 and the electric cables are supported from the messenger cable by the hook 33 which still engages the cable. Relative rotation of the elements 10 and 30 is prevented by the messenger cable engaging opposite sides of the slot 13 and the hook 33.

In order to place the clamp on the messenger cable, the hook 33 should be put over the cable and the element 10 should be slid and rotated to a position in which the opening 14 is directly opposite the cable, at which time the element 10 may be rotated into alignment with the element 30 and then slid into either the Fig. 5 or Fig. 6 position. The elements 10 and 30 may be retained in either the Fig. 5 or Fig. 6 positions thereof by tightening the nut 56.

While the invention has been described in connection with a specific embodiment thereof and in a specific use, various modifications thereof will occur to those skilled in the art without departing from the spirit and scope of the invention as set forth in the appended claims.

What is claimed is:

1. An electric cable clamp for use with messenger cables, comprising a first clamp element having a hook-like messenger receiving surface and a plurality of spaced cable gripping surfaces, a second clamp element having a hook-like messenger receiving surface and a like plurality of spaced cable gripping surfaces, said surfaces being arranged so that when said second element directly overlies said first element said messenger receiving surfaces form a substantially closed hole the sides of which are adapted to encompass and retain a messenger cable and corresponding ones of said cable gripping surfaces form a like plurality of substantially closed holes the sides of each of which are adapted to encompass and retain a cable, corresponding cable gripping surfaces of said elements, when said elements are in a vertically offset position, providing an opening through which a cable may be inserted or removed, said second element having a pair of vertically spaced holes and said first element having a vertically elongated slot and an opening spaced therefrom, said slot and said opening each being in registration with a respective one of said spaced holes when said second element directly overlies said first element, a generally U-shaped member having a long shank and a short shank, said long shank passing through one of said spaced holes and said elongated slot and extending beyond said first element and said short shank, in a first position of said U-shaped member, passing through the other spaced hole and into said opening adjacent an edge of said opening so as to prevent relative vertical motion of said elements, said short shank, in a second position of said U-shaped member, being clear of said opening thereby permitting relative vertical motion of said elements to said offset position thereof, and releasable means for retaining said member in either of said positions thereof.

2. An electric cable clamp for use with messenger cables, comprising a first clamp element having a hook-like messenger receiving surface adjacent one end thereof, a vertically elongated slot intermediate the ends thereof and a pair of spaced generally semicircular grooves adjacent the other end thereof, a second clamp element having a hook-like messenger receiving surface adjacent one end thereof, a vertically elongated slot intermediate the ends thereof and a pair of spaced generally semicircular grooves adjacent the other end thereof, said messenger receiving surfaces, when said elements are in a first position thereof in which said second element directly overlies said first element, forming a first closed hole the sides of which are adapted to encompass and retain a messenger cable, said elongated slots being partially in registration in said first position of said elements to form a second closed hole the sides of which are adapted to encompass and retain a cable, corresponding grooves in said elements facing in opposite directions and being arranged, in said first position of said elements, to form third and fourth closed holes each adapted to encompass and retain a respective cable, said elongated slots each having a cable admitting opening, the openings being in registration when said elements are in a second position thereof in which they are vertically offset, corresponding grooves being sufficiently offset in said second position of said elements to form corresponding cable admitting openings, said second element having a pair of vertically spaced holes one of which is in registration with said vertically elongated slot of said first element and the other of which is in registration with a second vertically elongated slot in said first element, a generally U-shaped bolt having a long shank extending through one of said spaced holes and through and beyond said second slot and a short shank normally extending through the other of said spaced holes and into said first elongated slot of said first element, and releasable means for retaining said U-shaped bolt in said position thereof thereby to retain said elements in said first positon thereof, said releasable means, when released, permitting retraction of said short shank out of said first elongated slot whereby said elements may be moved vertically relative to each other into said second position thereof.

3. An electric cable clamp, as set forth in claim 2, in which said second, third and fourth holes are arranged generally in the shape of an equilateral triangle.

4. An electric cable clamp for use with messenger cables, comprising a first clamp element having a hook-like messenger receiving surface adjacent one end thereof, a vertically elongated slot intermediate the ends thereof and a pair of spaced generally semicircular grooves adjacent the other end thereof, a second clamp element having a hook-like messenger receiving surface adjacent one end thereof, a vertically elongated slot intermediate the ends thereof and a pair of spaced generally semicircular grooves adjacent the other end thereof, said messenger receiving surfaces, when said elements are in a first position thereof in which said second element directly overlies said first element, forming a first substantially closed hole the sides of which are adapted to encompass and retain a messenger cable, said elongated slots being partially in registration in said first position of said elements to form a second substantially closed hole the sides of which are adapted to encompass and retain a cable, corresponding grooves in said elements facing in opposite directions and being arranged, in said first position of said elements, to form third and fourth substantially closed holes each adapted to encompass and retain a respective cable, said elongated slots each having a cable admitting opening, the openings being in registration when said elements are in a second position thereof in which they are vertically offset, corresponding grooves being sufficiently offset in said second position of said elements to form corresponding cable admitting openings, said second element having a pair of vertically spaced holes one of which is in registration with said vertically elongated slot of said first element and the other of which is in registration with a second vertically elongated slot in said first element, a generally U-shaped bolt having a long shank extending through one of said spaced holes and said second slot and a short shank normally extending through the other of said spaced holes and into said first elongated slot of said first element, and releasable means comprising a nut threaded on said long shank for retaining said U-shaped bolt in said position thereof thereby to retain said elements in said first position thereof, said releasable means, when released, permitting retraction of said short shank out of said first elongated slot whereby said elements may be moved vertically relative to each other into said second position thereof, said releasable means also permitting retention of said elements in said second position thereof.

References Cited in the file of this patent
UNITED STATES PATENTS

| | | |
|---|---|---|
| 1,078,711 | Whitehead | Nov. 18, 1913 |
| 2,457,435 | Beckman | Dec. 28, 1948 |
| 2,534,690 | Young | Dec. 19, 1950 |
| 2,783,296 | Hendrix | Feb. 26, 1957 |
| 2,820,083 | Hendrix | Jan. 14, 1958 |